United States Patent
Constantine et al.

(10) Patent No.: US 6,599,422 B2
(45) Date of Patent: Jul. 29, 2003

(54) SEPARATOR FOR LIQUIDS CONTAINING IMPURITIES

(75) Inventors: Christopher P. Constantine, Tenafly, NJ (US); Richard E. Fredricks, Severna Park, MD (US); Gerard J. Lynch, Bridgewater, NJ (US)

(73) Assignee: Maritime Solutions Technology, Inc., Tenafly, NJ (US)

( * ) Notice: Subject to any disclaimer, the term of this patent is extended or adjusted under 35 U.S.C. 154(b) by 45 days.

(21) Appl. No.: 09/885,885

(22) Filed: Jun. 20, 2001

(65) Prior Publication Data

US 2003/0006188 A1 Jan. 9, 2003

(51) Int. Cl.$^7$ ............................................. B01D 17/038
(52) U.S. Cl. ................... 210/512.3; 209/725; 415/204; 415/208.1
(58) Field of Search ......................... 210/512.1, 512.3; 415/203, 204; 209/159, 210, 725

(56) References Cited

U.S. PATENT DOCUMENTS

| | | |
|---|---|---|
| 1,837,191 A | 12/1931 | Baldwin |
| 2,073,520 A | 3/1937 | Saint-Jacques |
| 3,591,011 A | 7/1971 | Holter, et al. |
| 4,303,526 A | 12/1981 | Moro et al. |
| 4,305,825 A | 12/1981 | Laval, Jr. |
| 4,478,712 A | 10/1984 | Arnaudeau |
| 4,702,837 A | * 10/1987 | Lecoffre et al. ......... 210/512.3 |
| 4,857,175 A | 8/1989 | Spinnier |
| 4,864,994 A | 9/1989 | Myers |
| 4,980,064 A | 12/1990 | Carroll |
| 5,017,288 A | 5/1991 | Thew et al. |
| 5,084,189 A | 1/1992 | Richter |
| 5,104,520 A | 4/1992 | Maronde et al. |
| 5,104,541 A | 4/1992 | Daniel |
| 5,225,082 A | 7/1993 | Young et al. |
| 5,466,372 A | 11/1995 | Jerabek et al. |
| 5,470,465 A | 11/1995 | Moorehead et al. |
| 5,500,117 A | 3/1996 | Hamdan |
| 5,510,017 A | 4/1996 | Abdullayev |
| 5,667,686 A | 9/1997 | Schubert |
| 5,858,228 A | 1/1999 | Turchetti |
| 6,500,345 B2 | * 12/2002 | Constantine et al. .... 210/512.3 |

* cited by examiner

*Primary Examiner*—David A. Reifsnyder
(74) *Attorney, Agent, or Firm*—Notaro & Michalos P.C.

(57) ABSTRACT

A centrifugal separator for purifying liquids containing impurities, has a main fluid conduit forming a passage with an inlet for receiving raw liquid to be purified, and first and second outlets. A discharge conduit is in the passage and is connected to the first outlet. A stator is positioned in the fluid passage for imparting an initial swirling axial movement to the raw liquid. A rotor positioned in the fluid passage upstream of the discharge conduit and downstream of the stator, imparts a further swirling axial movement to the raw water in the fluid passage for causing solids in the raw liquid to migrate outwardly. Clean liquid enters the discharge conduit to exit the separator via the first outlet, and solids laden liquid passes the discharge conduit and exits the separator via the second outlet.

25 Claims, 8 Drawing Sheets

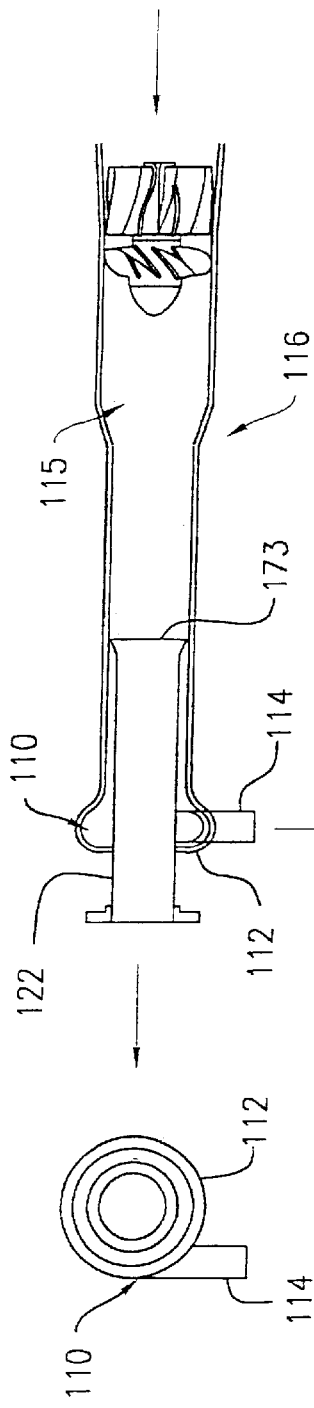
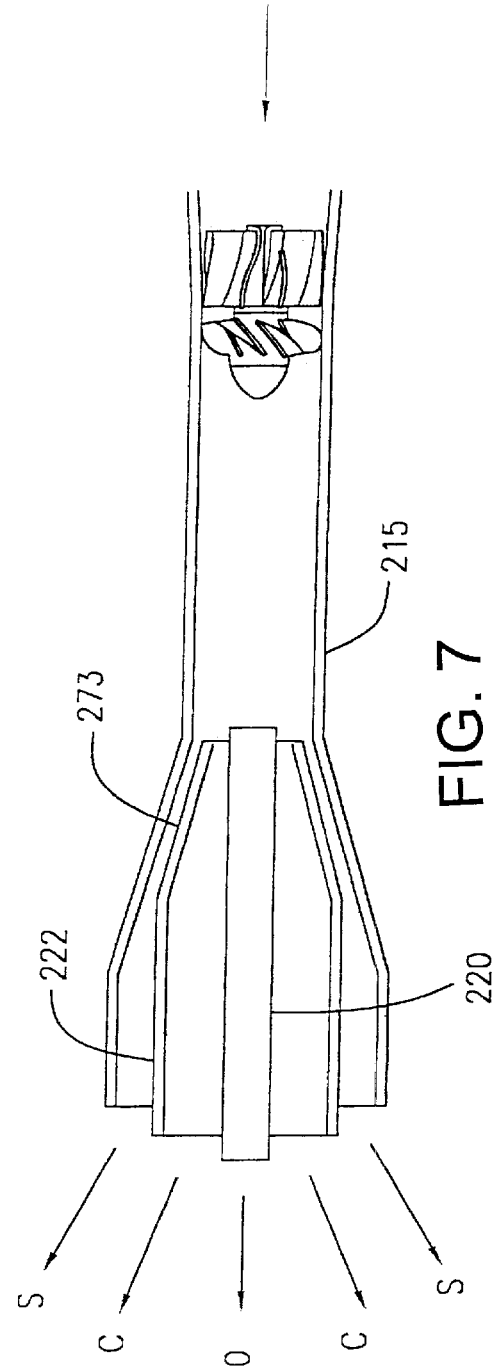

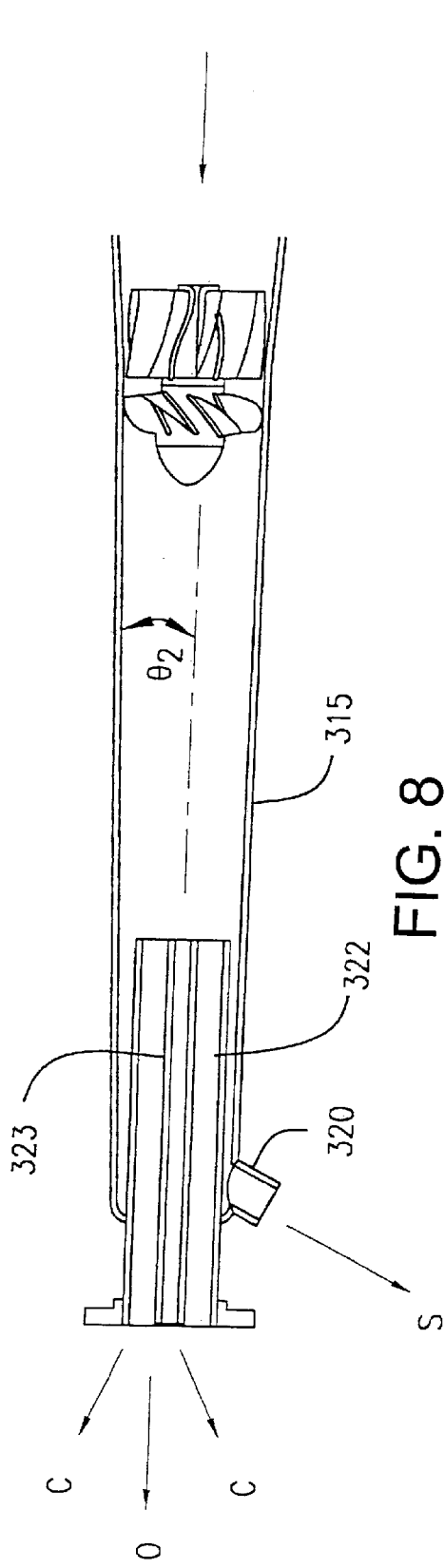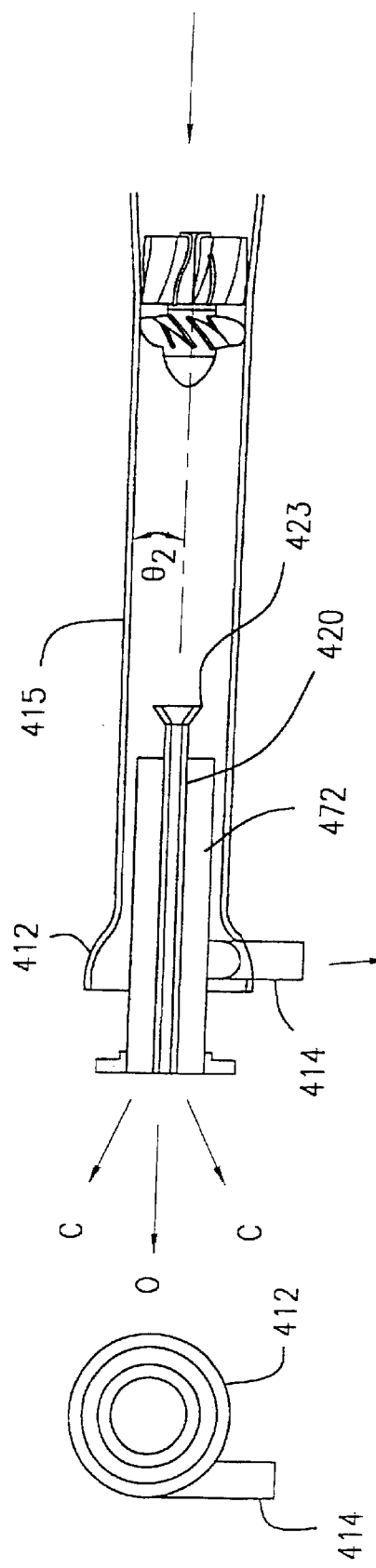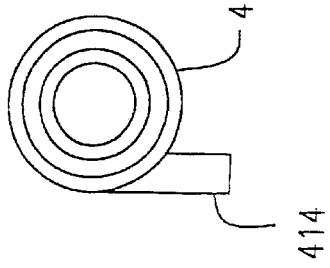

SEPARATOR FOR LIQUIDS CONTAINING IMPURITIES

FIELD AND BACKGROUND OF THE INVENTION

The present invention relates in general to liquid purification apparatuses, and in particular, to a new and useful separator for treating liquids such as water by removing solids and contaminating liquids such as oils using a centrifugal separating effect.

U.S. Patents which are material to the separator of the present invention are U.S. Pat. Nos.: 1,837,191; 2,073,520; 3,591,011; 4,303,526; 4,305,825; 4,478,712; 4,857,175; 4,864,994; 4,980,064; 5,017,288; 5,084,189; 5,104,520; 5,104,541; 5,225,082; 5,466,372; 5,470,465; 5,500,117; 5,510,017; 5,667,686; and 5,858,228.

SUMMARY OF THE INVENTION

An object of the present invention is to provide a separator for treating liquids such as water, which comprises a centrifugal separator for receiving the raw liquid to be purified, the separator separating higher density solids with some liquid from the raw liquid to produce a clean liquid flow out of the separator at a first outlet, and a second outlet for a solids laden flow out of the separator.

A further object is to provide a centrifugal separator for general use to separate solids for a raw liquid such as sea or lake water, and for separating lighter-than-water liquids such as oils for the raw liquid. The separator includes a main conduit forming a fluid passage, stator means positioned in the fluid passage for imparting an initial swirling axial movement to the raw liquid in the fluid passage passing, rotatable solid core rotor means positioned in the fluid passage downstream of the stator means for imparting a further swirling axial movement to the raw liquid in the fluid passage downstream of the rotor means and in a discharge conduit, and for causing solids to migrate outwardly in the main conduit, the stator means comprising a stator hub and a plurality of circumferentially spaced fixed helical blades connected to the stator hub, the rotor means comprising an rotor hub and a plurality of circumferentially spaced rotating helical blades connected to the rotor hub.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 5 is a longitudinal sectional view of another embodiment of the separator for use with the invention and having a tangential volute discharge;

FIG. 6 is a radial sectional view of the separator of FIG. 6 taken near the outlet end of the device;

FIG. 7 is a longitudinal sectional view of another embodiment of the separator having an axially enlarging conical outlet;

FIG. 8 is a longitudinal sectional view of further embodiment of the separator having a conical separator passage or conduit and other advantageous features of the invention;

FIG. 9 is a longitudinal sectional view of another embodiment of the separator having a semi-volute or conical outlet for the main passage or conduit;

FIG. 10 is a radial sectional view of the separator of FIG. 9 taken near the outlet end of the device;

DESCRIPTION OF THE PREFERRED EMBODIMENT

Figure 1:
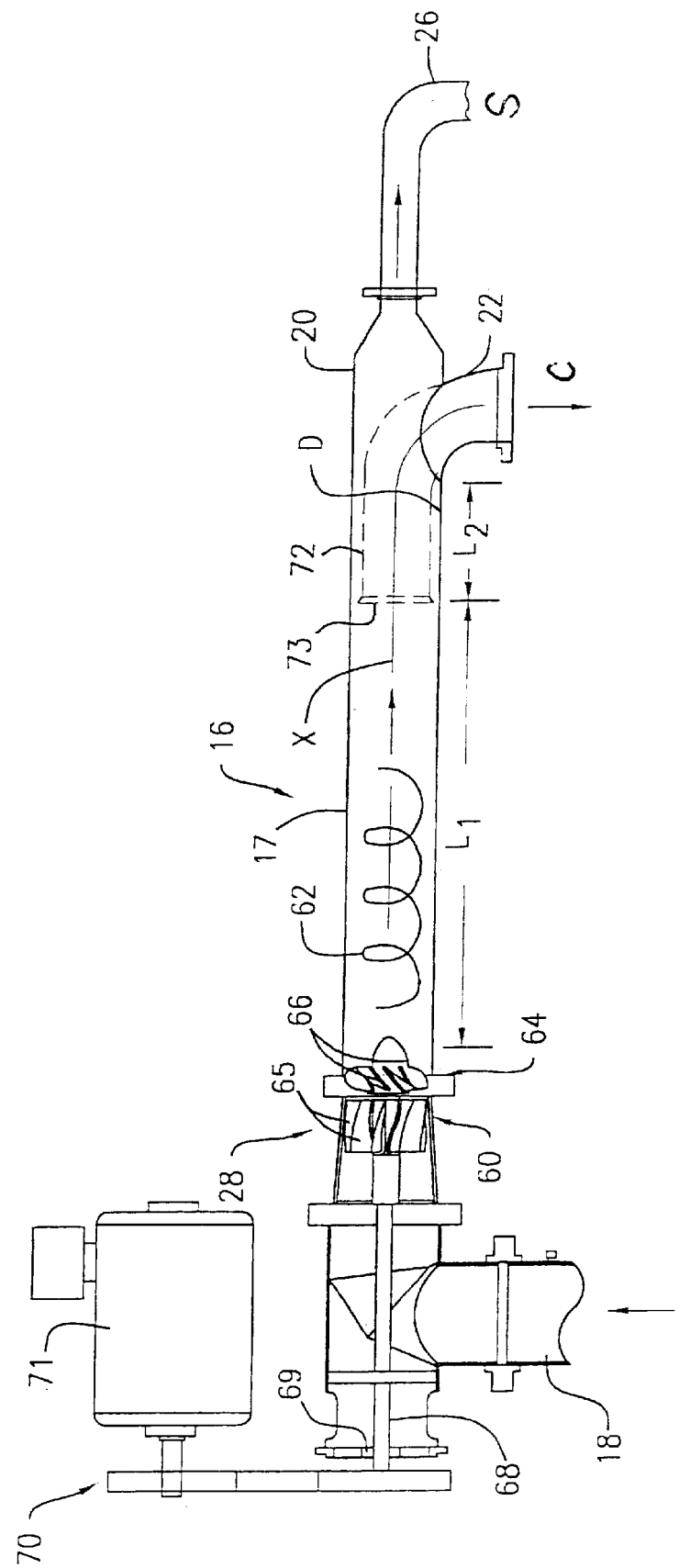
FIG. 1 is a longitudinal sectional view of a centrifugal separator of the present invention.

Referring to the drawings in particular, the invention embodied therein comprises an apparatus for treating liquids in general, or specifically water to be supplied purified of solids and certain light liquid.

Preferred embodiments of the separator are generally designated 16 in FIGS. 1 to 4 and are centrifugal separators as will be explained in the following.

Centrifugal separator 16 in FIG. 1 comprises a main conduit forming a fluid passage or pipe 17, connected between a main separator inlet 18 for receiving raw liquid, such as sea or lake water, and the first and second outlets 22, 20, respectively for discharging clean liquid C and solids-laden liquid S. The separator has a longitudinal axis X and a discharge conduit 26 connected to the second outlet 20.

Composite swirl means 28 are positioned in the fluid passage for imparting a swirling axial movement 62 to the raw liquid water in the fluid passage, downstream of the swirl means for causing solids such as sediment, to migrate radially outwardly in the main conduit. These swirl means, according to the present invention, comprise a stator 60 and a downstream rotor 64 in the fluid passage of the separator.

Figure 3:
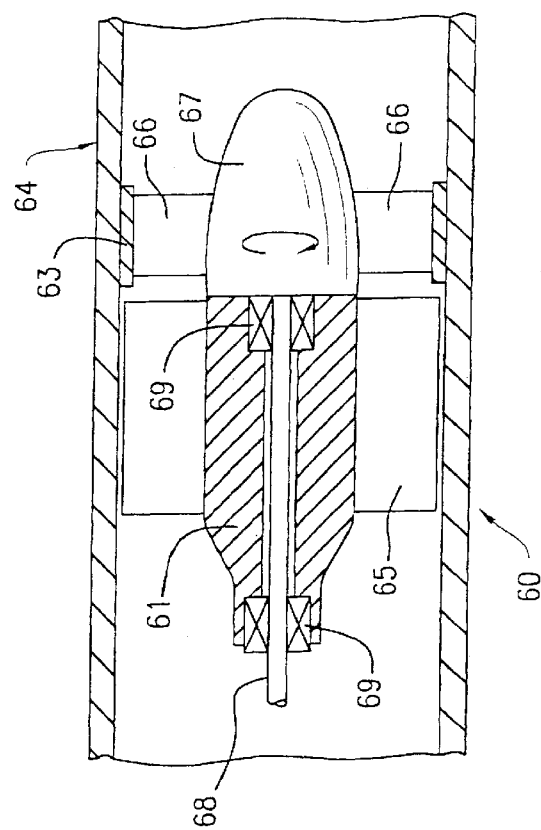
FIG. 3 is an enlarged view of the hub area of the stator and the rotor of the separator of the invention.

The stator 60, also shown in FIG. 3, has a fixed streamlined hub 61 and a plurality of circumferentially spaced blades 65 fixed around the hub and extending along the longitudinal axis of the fluid passage to initiate the swirling flow 62 as the water passes the blades. Blades 65 are preferably helical but may have another shape as long as they impart a swirling motion to the liquid as it passes the stator.

The rotor 64 also comprises a streamlined hub 67 which is mounted for rotation in the passage, on a shaft 68 mounted on bearings 69 in the stator hub 61 and at the inlet end of the passage. A belt and pulley or gear system 70 with a motor 71 drive the shaft 68 and rotate the hub 67 as shown in FIG. 1.

A plurality of circumferentially spaced, preferably helical rotor blades 66 are connected around the rotor hub 67 and extend along the longitudinal axis of the fluid passage to continue and enhance the swirling flow 62 as the water passes the rotor. Here again the blades may have a shape other than helical as long as the rotation of the rotor causes additional swirling of the liquid.

The rotor may use open-ended blades (FIG. 4) or blades with an outer cylindrical shroud 63 (FIG. 3) which helps order the flow and reduce turbulence.

The pitch, size and number of helical blades 65 and 66, the fluid passage or separation chamber length, as well as the rotational speed, inside diameter and flow through the swirl means are all selected for removing solids from solids containing liquid such as navigable water, at any selected flow rate, e.g. 1 to 20,000 cubic meter/hours or more or less, depending on the use to which the separator of the invention will be put.

Figure 2:
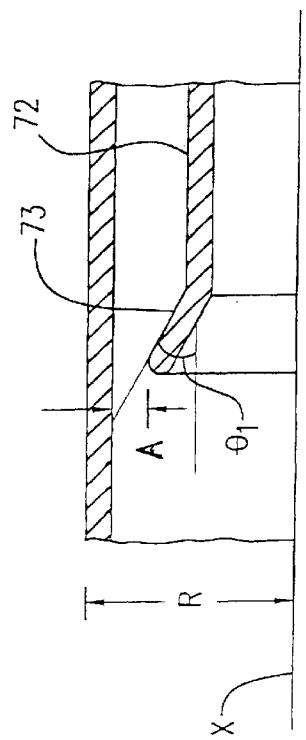
FIG. 2 is an enlarged view of the outlet area of the separator of FIG. 1.

As illustrated ion FIGS. 1 and 2, a central clean liquid or water discharge pipe 72 with a flared inlet opening 73 is place at a distance L1, downstream from the swirl means 28. As shown in FIG. 2, an annular passage or gap around flared inlet 73 has a radial width A and is sized for receiving solids or sediment laden liquid or water, the solids or sediment migrating to the walls of the passage due to centrifugal forces caused by the swirling 62 if the raw liquid. Annular gap A is proportional to the radius R of the separator passage to maximize solids in the water passing through the gap A. Clean or purified water which is free of solids enters inlet 73 which is referred to here as the first clean water inlet 73, and leave the separator through outlet 22.

The length L1 is selected to be long enough to establish a fully developed, smooth and stable swirl 62, and to give the solids time to move out from the passage axis X, to the inner surface of the outer passage wall.

The length L2 of the discharge pipe 72 from the first clean water inlet 73 to a dead spot D where the outlet pipe 22 bends away from the axis X and leaves the passage, or a dead spot caused by any other geometer (see D in FIG. 4 for example) is selected to be long enough so that the first clean water inlet 73 is upstream of a back pressure turbulence caused by the dead spot. The presence of this turbulence due to the dead spot D has been shown by computer models of the operation of the separator, and the selection of length L2 for the discharge pipe has been found to be a useful solution. The turbulence causes particles that had been separated to re-mix with the initially purified water before the heavy sediment has had a chance to pass annular gap A.

Figure 4:
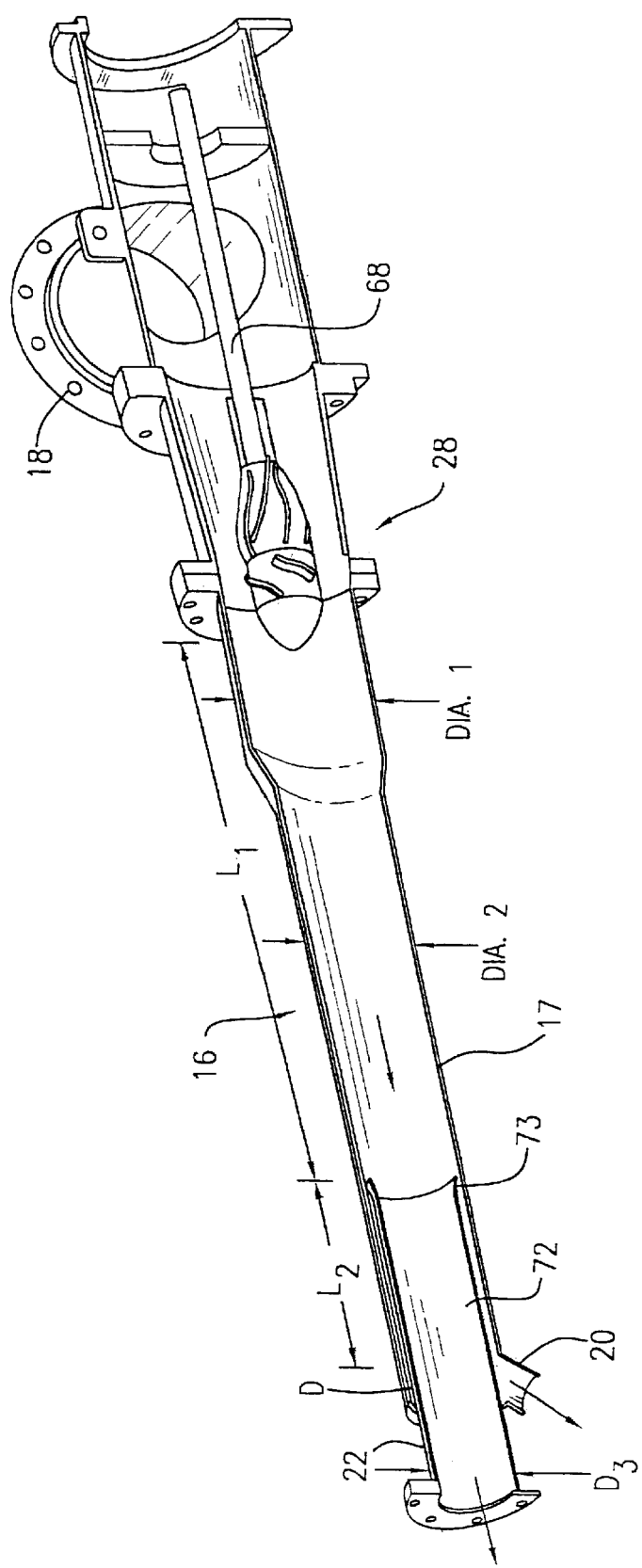
FIG. 4 is a perspective view with portioned cut-away, of the separator of the present invention.

As shown in FIG. 1, two 45 degree turns are used to channel the raw liquid from a vertical direction at inlet 18, into the main conduit and horizontally to the axis X of the separator. In FIG. 4 the inlet is a 90 degree turn inlet.

Preferred values for the various physical and operational parameters for the separator of the invention have been established. The centrifugal separator of the invention has been designed so as to increase its "heavy" solids collection capability, particularly the solids collection portion with engineered refinement. The inventors anticipate a 98%+ extraction of silt and sediment yielding "clean" water when the invention is used to clean raw navigable water.

The following table contains examples and ranges for the various structural parameters of the separator of the present invention:

The present invention is envisioned for various pipeline sizes. Representative dimension ranges are given in the following table. The preferred dimensions assume a separator pipe diameter Dia1 (FIG. 4) of 10 inch.

| Parameter | Preferred Range (inches or degrees) | Preferred Dimension (inches or degrees) |
| --- | --- | --- |
| L1 (open passage) | 10"–120" | 60" |
| L2 (discharge pipe) | 6"–48" | 24" |
| Dia1 (17 - diameter) | 1"–36" | 10" |
| Dia2 (28 - diameter) | 0.75"–32" | 8" |
| Dia3 (20 - diameter) | 0.75"–32" | 6" |
| R (annular gap) | 0.125"–2.5" | 1" |
| θ1 (flare angle) | 10°–45° | 22° |
| θ2 (FIGS. 13, 14, 19) | 5°–20° | 10° |

FIGS. 5 to 16 illustrate other embodiments and features of the separator of the invention. Before describing these in detail, however, the following general considerations for design of the separator are disclosed:

The separator is a continuous centrifugation apparatus which uses a shaft mounted, axially positioned, multiple blade rotor assembly, with rotational speeds of 1000–10,000 RPM to cause centrifugal separation of, suspended solids in the range of 0.5–1776 micron from a feed inlet liquid such as a body of water.

It uses a shaft mounted, axially positioned, multiple blade rotor assembly, with rotational speeds of 1000–10,000 RPM to cause centrifugal separation of, lighter specific gravity fluid from a heavier feed inlet liquid.

The multi-blade rotor 64 is of a design that enables exiting liquid to produce a mixed flow configuration creating both axial and radial flow path, blade swirl angles being between 5° and 45°.

Figure 12:
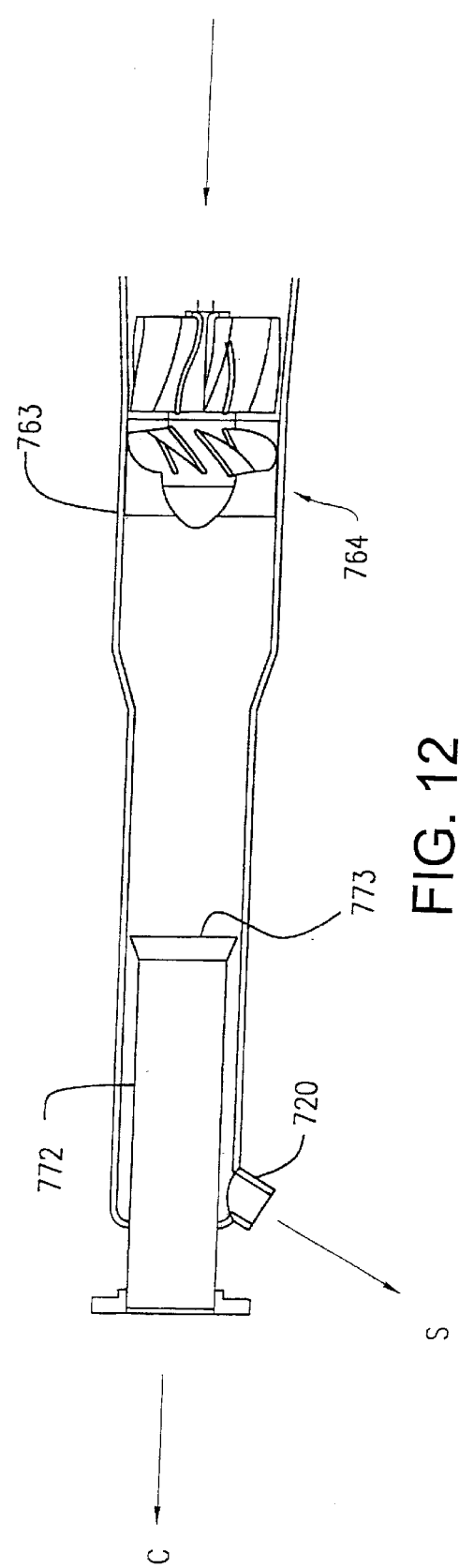
FIG. 12 is a longitudinal sectional view of a still further embodiment of the separator.

The multi-blade rotor may either be an open blade rotor or a shrouded blade rotor (e.g. FIGS. 3 and 12).

The stator plus rotor effect separation "G" gravitational forces that are optimized and cavitation is minimized.

A positive head is produced across the device (inlet to outlet) and the degree of centrifugation is controllable by varying the rotor speed or by varying the rotor pitch angle.

The axial stator blade arrangement is upstream of the rotor to create a pre-swirl of the incoming liquid therefore enhancing the centrifugal separation of suspended solids from liquid.

The rotor and stator hub contour design effectively reduce viscous drag forces and improve efficiency during the development of separate high and low velocity discharge regions. The high velocity region being where higher "G" forces take place and the separation of higher specific gravity material (liquid and solids) from the lighter specific gravity inlet liquid.

Figure 11:
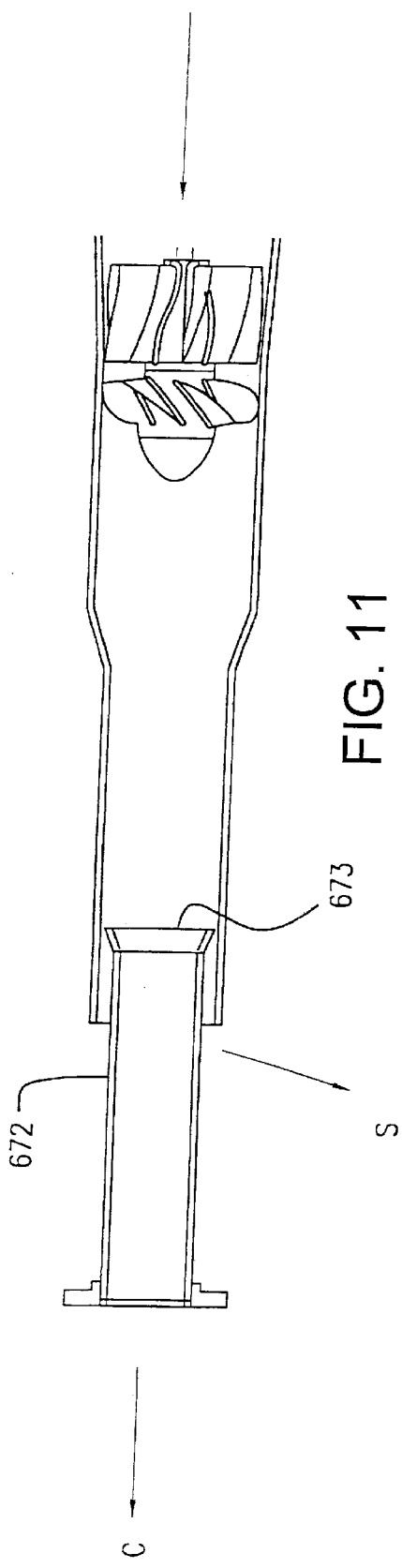
FIG. 11 is a longitudinal sectional view of another embodiment of the separator.
Figure 14:
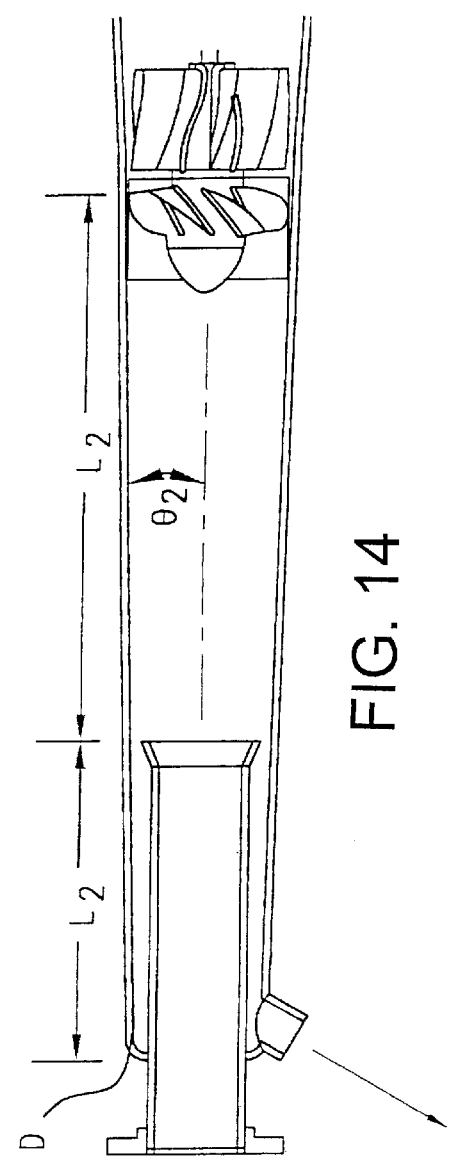
FIG. 14 is a longitudinal sectional view of further embodiment of the separator having a conical main passage or conduit.
Figure 15:
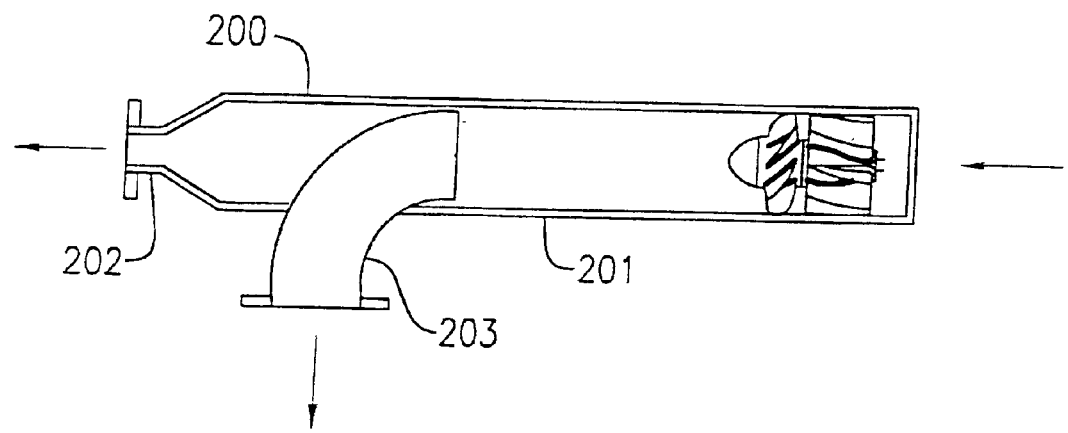
FIG. 15 is a longitudinal sectional view of an embodiment of the separator having solid discharge through an annular diffuser similar to the embodiment of FIG. 1 but with out a conical inlet to the solids discharge.

Dirty effluent liquid enters a tubular or conical chamber around inlet 73. The chamber has multiple adjustable or fixed discharge ports including several solid discharge arrangements such as:

solids discharge through an annular diffuser (FIG. 15);

solids discharge through a tangential volute (FIG. 5);

solids discharge through an impingement orifice (FIG. 11);

solids discharge through a conical axial opening (FIG. 7); or solids discharge through a 45° opening (FIG. 14).

The continuous centrifugation apparatus of the invention cleans effluent liquid that enters a tubular or conical chamber. The chamber has multiple adjustable or fixed discharge ports including several clean fluid discharge arrangements such as:

clean fluid discharge through an annular diffuser (FIG. 8); or clean fluid discharge through a conical axial opening (FIG. 7).

The light effluent liquid enters a tubular or conical chamber. The chamber has multiple adjustable or fixed discharge ports including several clean fluid discharge arrangements such as:

light specific gravity fluid discharge (e.g. lighter-than-water oils) through a central diffuser (FIGS. 7 to 9).

FIGS. 5 and 6 illustrate an embodiment of the separator 116 having a tangential volute sediment rich discharge assembly 110 formed by an annular toroidal enlargement 112 of the separator passage pipe or conduit 115. A tangential discharge pipe or outlet 114 extends from enlargement 112. Substantially sediment or particle-free water is discharged axially through the clean-water outlet 122.

An inlet 173 of discharge 122 is flared or conical and the diameter of conduit 115 is stepped down as in the embodiment of FIG. 4. The stepping down of the separator conduit increases the speed of the water downstream of the step, in the x or axial direction, in the y or radial direction and in the z or circumferential direction, to increase the separation effect.

FIG. 7 illustrated another embodiment of the separator which has an axially enlarging conical outlet for clean and "dirty" water 215 and 273 respectively. This embodiment also has a central discharge 220 for a light-fluid containing water fraction which, for example, has a high concentration of oils that are generally lighter than water and are also generally present as contaminants in bodies of navigable water. The separator of the invention can thus separate "clean" water C through its first discharge 222, heavy substance (e.g. solids or sediment) contaminated or "dirty" water S through a second discharge 273, oil or light fluid containing water O through a third discharge 220.

FIG. 8 illustrated an embodiment of the separator having a conical separator passage or conduit 315 which decreases in diameter toward the respective first 322, second 320 and third 323 outlets for the respective clean (C), heavy (S) and light (O) water discharges. The conical shape, like the diameter reduction of FIG. 10, increases the speed of the water downstream of the unit in the x (axial) direction, the y (radial) direction and z (circumferential) direction, to increase the separation effect. The angle θ2 of the conical conduit wall from the axis of the passage is about 10° or preferably about 5° to 20°.

FIGS. 9 and 10 show a separator of the invention which has a conical conduit 415 like that of FIG. 8, but uses a flattened or semi-toroidal volute discharge chamber 412 with a tangential solids discharge 414 of water S. The light fluid laden water outlet 420 for water O has a flared inlet 423 and the clean water outlet 472 for water C has a cylindrical inlet and body.

FIGS. 11 and 12 are views of other embodiments of the separator having a conical impingement orifices 673 and 773 for the clean water outlets 672 and 772. An axial solid water outlet 620 is illustrated in FIG. 11 and a radially extending solid water outlet 720 is illustrated in FIG. 12. FIG. 12 also illustrates the use of a shroud 763 around the rotor blades of the rotor 764 in this embodiment of the invention. It is understood that a rotor, with or without a shroud can be used for any embodiment of the invention depending performance for separating various contaminants.

Figure 13:
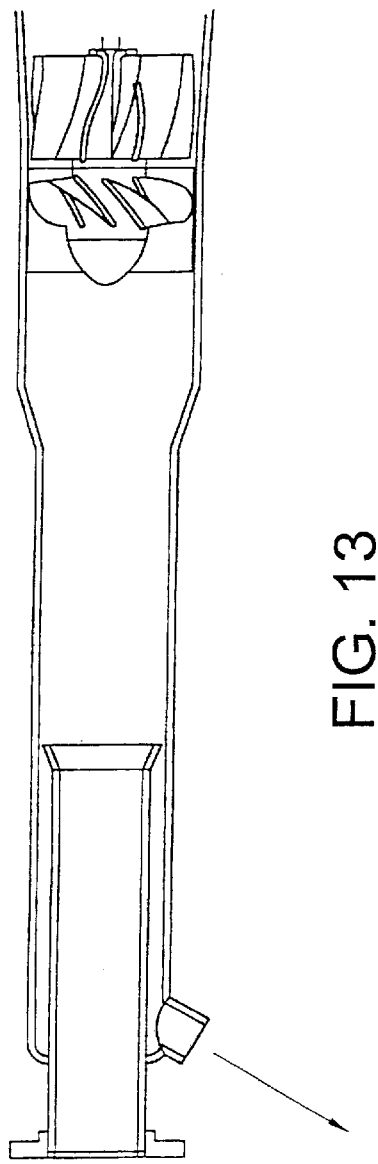
FIG. 13 is a longitudinal sectional view of another embodiment of the separator having a stepped conical separator passage or conduit.

FIGS. 13 and 14 show respective stepped and conical separator passaged used in conjunction with a flared clean water discharge inlet. Length L1 is selected to insure a fully developed swirl before the water reached the clean water inlet and L2 is selected to prevent turbulence in the swirling liquid entering and passing the inlet due to the termination of the passage at D.

FIG. 15 is a view of an embodiment similar to FIG. 1, where the outlet 200 for dirty water continues cylindrically from the main separator pipe 201 but experiences and conical reduction in diameter at 202. This causes a back pressure in the water in the passage 201 which can be useful for certain application, upstream of the clean water outlet 203. The solid discharge 200 is through an annular diffuser without a conical inlet to the solids discharge.

Figure 16:
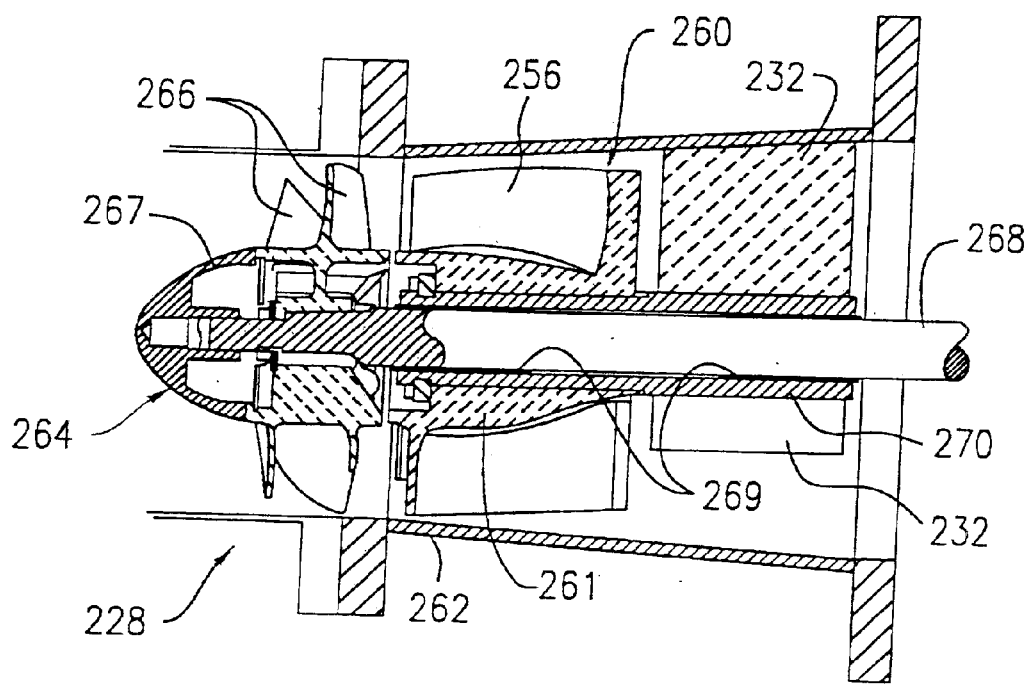
FIG. 16 is longitudinal sectional and enlarged view of a separator of the present invention in the area of the swirl means of the device.

FIG. 16 is a longitudinal sectional and enlarged view of a separator of the present invention in the area of the swirl means 228 of the device.

The stator 260 has a fixed streamlined hub 261 and a plurality of circumferentially spaced helical blades 265 fixed around the hub and extending along the longitudinal axis of the fluid passage to initiate swirling flow as the water passes the blades. The rotor 264 also comprises a streamlined hub 267 which is mounted for rotation in the passage 262 on a shaft 268 mounted on bearings 269 in the stator hub 261 and in an fixed sleeve 270.

A plurality of circumferentially spaced helical rotor blades 266 are connected around the rotor hub 267 and extend along the longitudinal axis of the fluid passage to continue and enhance the swirling flow as the water passes the rotor. The rotor may use open-ended blades or blades with an outer cylindrical shroud which helps order the flow and reduce turbulence.

Sleeve 270 is fixed in the passage 262 by three circumferentially spaced and equidistant spokes of support 232 welded or otherwise fixed between the sleeve and the passage wall.

ADVANTAGES OF THE INVENTION

The apparatus of the invention is completely scalable and can, as a result, produce flow rates equal to a required loading rates.

The compact size and energy efficiency of the separator allows for easy and cost effective installation and operation.

While specific embodiments of the invention have been shown and described in detail to illustrate the application of the principles of the invention, it will be understood that the invention may be embodied otherwise without departing from such principles.

What is claimed is:

1. A centrifugal separator apparatus for purifying liquids containing solid impurities, comprising:

fluid passage means having an inlet for receiving raw liquid to be purified, and first and second outlets, the passage means having a longitudinal axis;

a discharge conduit in the passage means connected to the first outlet;

the passage means comprising a main separator conduit and the discharge conduit having an inlet end for receiving relatively clean liquid and which is separated from the separator conduit by a gap forming an inlet end for the second outlet for receiving solids laden liquid;

stator means fixed in the main separator conduit for imparting an initial swirling axial movement to the raw liquid in the fluid passage means passing the stator means; and rotor means mounted for rotation in the main separator conduit, upstream of the discharge conduit inlet end, and downstream of the stator means, for rotating to impart a further swirling axial movement to the raw liquid in the main separator conduit downstream of the rotor means for causing solids in the raw liquid to migrate outwardly in the main separator conduit;

relatively clean liquid entering the discharge conduit inlet end to exit the separator apparatus via the first outlet, and solids laden liquid passing the discharge conduit inlet end and exiting the separator apparatus via the second outlet.

2. An apparatus according to claim 1, wherein the stator means comprises a stator hub and a plurality of circumferentially spaced fixed blades connected to the stator hub, the rotor means comprising an rotor hub and a plurality of circumferentially spaced rotating blades connected to the rotor hub.

3. An apparatus according to claim 2, wherein the inlet end of the discharge conduit is cylindrical.

4. An apparatus according to claim 2, wherein the inlet end of the discharge conduit is flared outwardly toward the separator conduit.

5. An apparatus according to claim 4, wherein the inlet end of the discharge conduit is flared at an angle of about 10° to about 45°.

6. An apparatus according to claim 5, wherein the blades of the stator and rotor means are helical.

7. An apparatus according to claim a shroud around the blades of the rotor means.

8. An apparatus according to claim 4, wherein the stator and the rotor hubs are streamlined and smoothly transition into each other.

9. An apparatus according to claim 4, including a rotor shaft connected to the rotor hub and mounted for rotation to the passage means, and bearing means between the stator hub and the rotor shaft for rotational support of the rotor shaft.

10. An apparatus according to claim 4, wherein the gap is about 0.125 inches to about 2.5 inches wide.

11. An apparatus according to claim 4, wherein a length of the discharge conduit is about 6 inches to about 48 inches, and a length from the rotor means to the inlet end of the discharge conduit is about 10 inches to about 120 inches for reducing turbulence near the inlet end and for permitting the stator and rotor means to create a fully developed swirl upstream at the inlet end.

12. An apparatus according to claim 4, wherein the separator conduit has a reduction in diameter in at least one area from the rotor means to the inlet end of the discharge conduit for increasing the speed of liquid flow in the separator conduit.

13. An apparatus according to claim 12, wherein the reduction in diameter comprises and step down in diameter.

14. An apparatus according to claim 13, wherein the separator conduit diameter upstream of the step down is about 1 inch to about 36 inches and the separator conduit diameter downstream of the step down is about 0.75 inches to about 32 inches.

15. An apparatus according to claim 13, wherein the reduction in diameter comprises the separator conduit being conically reduced in diameter downstream of the swirl means.

16. An apparatus according to claim 15, wherein the separator conduit is conically reduced at an angle from the axis of the separator conduit of about 5 to 20 degrees.

17. An apparatus according to claim 4, wherein the first outlet exits the passage means radially.

18. An apparatus according to claim 4, wherein the second outlet exits the passage means radially.

19. An apparatus according to claim 4, wherein the second outlet includes a volute chamber and a tangential discharge in the passage means.

20. An apparatus according to claim 4, wherein the first and the second outlets extend conically outwardly downstream of the rotor means.

21. An apparatus according to claim 4, including a third outlet for liquid with a high concentration of light fluid near the center of the first outlet for discharging liquid with a high concentration of light fluid through the third outlet.

22. An apparatus according to claim 21, wherein the third outlet comprised a further conduit in the discharge conduit.

23. An apparatus according to claim 22, wherein the further conduit has a flared inlet end.

24. An apparatus according to claim 22, wherein the further conduit has cylindrical inlet end.

25. An apparatus according to claim 1, wherein the rotor means includes blades and a shroud around the blades of the rotor means.

* * * * *